(12) United States Patent
Ricciuti et al.

(10) Patent No.: US 7,695,335 B2
(45) Date of Patent: Apr. 13, 2010

(54) MARINE LOCATOR DEVICE

(75) Inventors: Paul Jude Ricciuti, Davenport, IA (US); Raymond Edward Baumgarten, Eldridge, IA (US); Kevin Lee Hocker, Colona, IL (US); Mark Richard Ziegler, Bettendorf, IA (US)

(73) Assignee: Logeon Spec Ops, Inc., Davenport, IA (US)

( * ) Notice: Subject to any disclaimer, the term of this patent is extended or adjusted under 35 U.S.C. 154(b) by 158 days.

(21) Appl. No.: 11/916,608

(22) PCT Filed: Jun. 6, 2006

(86) PCT No.: PCT/US2006/021960

§ 371 (c)(1),
(2), (4) Date: Dec. 21, 2007

(87) PCT Pub. No.: WO2006/133212

PCT Pub. Date: Dec. 14, 2006

(65) Prior Publication Data

US 2008/0207067 A1    Aug. 28, 2008

Related U.S. Application Data

(60) Provisional application No. 60/687,588, filed on Jun. 6, 2005.

(51) Int. Cl.
*B63C 9/08* (2006.01)
(52) U.S. Cl. ...................................... 441/89
(58) Field of Classification Search ............ 441/89
See application file for complete search history.

(56) References Cited

U.S. PATENT DOCUMENTS

| | | | |
|---|---|---|---|
| 4,099,282 A | | 7/1978 | Townsend |
| 5,201,884 A | * | 4/1993 | Nicholas .................. 43/26.1 |
| 5,319,376 A | | 6/1994 | Eninger |
| 5,408,238 A | | 4/1995 | Smith |
| 5,886,635 A | | 3/1999 | Landa et al. |
| 5,929,777 A | | 7/1999 | Reynolds |
| 6,222,484 B1 | | 4/2001 | Seiple et al. |
| 6,439,941 B2 | | 8/2002 | McClure et al. |
| 6,545,606 B2 | | 4/2003 | Piri et al. |
| 6,567,004 B1 | | 5/2003 | Landa et al. |
| 6,701,252 B2 | | 3/2004 | Brown |
| 6,850,152 B1 | * | 2/2005 | Woodall et al. ............ 340/332 |
| 6,935,912 B1 | | 8/2005 | Myers |

FOREIGN PATENT DOCUMENTS

| | | |
|---|---|---|
| GB | 2165977 | 4/1986 |
| WO | WO2004/091090 | 10/2004 |

* cited by examiner

*Primary Examiner*—Stephen Avila
(74) *Attorney, Agent, or Firm*—Fish & Richardson P.C.

(57) ABSTRACT

A marine locator device including: a light section including a visible light emitter and an infrared light emitter; a communication device operable to broadcast an information signal; a controller operable to communicate with and control the light section and the communication device; a power supply electrically connected with the light section, the communication device, positioning system, and a controller; and a positioning system configured to determine geographic coordinates of the device, wherein the controller is operable to communicate with and control the positioning system and to incorporate the geographic coordinates into the information signal.

24 Claims, 5 Drawing Sheets

MARINE LOCATOR DEVICE

CROSS-REFERENCE TO RELATED APPLICATIONS

This application is a US national stage under 35 U.S.C. §371 of PCT/US2006/021960 filed Jun. 6, 2006, which in turn claims the benefit of priority from U.S. Provisional Application Ser. No. 60/687,588, filed on Jun. 6, 2005. These applications are herein incorporated by reference in their entirety.

TECHNICAL FIELD

This invention relates to locating a position in a body of water.

BACKGROUND

A person on the deck of a surface vessel risks falling overboard. Whether or not an overboard person survives in the water depends upon the ability to retrieve the person from the water before the person drowns or succumbs to other hazards (e.g., hypothermia). However, several factors can impede the location and rescue of a person in the water including poor visibility, rough sea states, and an inability to circle back to the person's position (particularly for large vessels) upon becoming aware of a "man overboard" condition.

To facilitate water rescue efforts, particularly in adverse conditions, marine location markers can be used to mark the approximate position of a person in the water. Marine location markers can be pyrotechnic devices that provide a signal, in the form of smoke and fire, to would-be rescue craft. Marine location markers can also be electronic devices configured to provide one or more signals including visual, audible, and position signals. By responding to the signal of the marine location markers, would-be rescue craft can localize search efforts to the area most likely to contain the person overboard, thereby improving the probability of rescue.

Marine location markers can also be useful in other applications requiring a reference to a specific point on a body of water. For example, marine location markers can be used to mark the boundary of a chemical spill in the water. The subsequent movement of the marine location marker provides an indication of the spread of the chemical spill. In another example, marine location markers can be used to mark the position of a rendezvous point for two vessels. In still another example, marine location markers can be used to mark the position of an object (e.g., lost cargo) in the water.

Current MK 25/MK 58 Marine Location Markers are devices designed to provide visual reference to a specific point at sea. The units contain red phosphorous, which is no longer produced in North America and must be acquired from overseas sources, and other chemicals, which are blended to form the compound necessary for the MK 58 and MK 25 candles to produce flame and smoke. These units require careful storage and disposal because of their pyrotechnic nature (e.g., phosphorous by nature can spontaneously ignite).

SUMMARY

Novel marine location devices and systems include a real-time locator, a Global Positioning System transponder and/or radio frequency beacon, a human visible light beacon, and an infrared light beacon. Signals from marine location devices to remote units can contain information specific to the marine location devices and their environment (e.g., location, water, temperature, sea state) and signals from remote units to marine location devices can control operation of the marine location devices.

In an aspect of the invention, a marine locator device includes a light section including a visible light emitter and an infrared light emitter; a communication device operable to broadcast an information signal; a controller operable to communicate with and control the light section and the communication device; a power supply electrically connected with the light section, the communication device, positioning system, and a controller; and a positioning system configured to determine geographic coordinates of the device, wherein the controller is operable to communicate with and control the positioning system and to incorporate the geographic coordinates into the information signal.

In an aspect of the invention, a marine locator system includes: a marine locator device and a remote unit. The marine locator device includes: a light section including a light emitter; a communication device operable to broadcast an information signal and to receive a control signal; a controller operable to communicate with and control the light section and the communication device; and a positioning system configured to determine geographic coordinates of the device, wherein the controller is operable to communicate with and control the positioning system and to incorporate the geographic coordinates into the information signal. The remote unit comprising a control signal generator and a transmitter.

In an aspect of the invention, a marine locator device includes: a substantially cylindrical watertight container approximately 21.7 inches long with an outer diameter of approximately 5 inches with a first end and a second end opposite the first end, the container including transparent portion on the first end, wherein a center of gravity of the device is closer to the second end of the container than to the first end of the container; a light section including a visible light emitter and an infrared light emitter; a two-way radio transceiver connected to the power supply and microcontroller and operable to broadcast an encrypted information signal beyond the watertight cylindrical container and further operable to receive an encrypted control signal generated by a remote unit; a microcontroller operable to communicate with and to control the operating states of the first light beacon, the second light beacon, and the two-way radio transceiver; a Global Positioning System receiver wherein the microcontroller is operable to communicate with and control the Global Positioning System receiver and to incorporate the geographic coordinates into the encrypted information signal, and a temperature sensor arranged to measure a temperature proportional to the temperature of water surrounding the watertight cylindrical container and to communicate the sensed temperature to the microcontroller.

Embodiments can include one or more of the following features.

In some embodiments, the communication device is further operable to receive a control signal from a remote unit. In some cases, the controller includes a decryption module operable to decrypt the control signal. In some cases, the controller is operable to stop the broadcast of the information signal in response to the control signal from the remote unit. In some cases, the controller is operable to switch between the visible light emitter and the infrared light emitter in response to the control signal from the remote unit.

In some embodiments, marine locator devices also include a substantially cylindrical container. In some cases, the container includes a transparent portion through which light from the light section is emitted, the transparent portion located at the first end of the container. In some cases, the container includes an interior cavity, the interior cavity extending axially within the container from a second end of the container that is opposite a first end of the container. The power supply can weigh at least 2 pounds and be positioned in the interior cavity such that a center of gravity of the device is closer to the second end of the container than to the first end of the container. A battery power supply can have a nominal voltage of 6 volts direct current with a capacity of 18-20 Amp-hours.

In some embodiments, marine locator devices also include a scuttling device operable to allow water into the container. In some cases, marine locator devices also include a timing mechanism operable to activate the scuttling device. In some cases, the scuttling device includes a solenoid. In some cases, the controller is operable to activate the scuttling device in response to a scuttling signal received through the communication device. The scuttling device can be a non-pyrotechnic scuttling device capable of activation to sink the marine locator device.

In some embodiments, the power supply has a nominal voltage of 6 volts direct current and a capacity of at least 15 ampere-hours.

In some embodiments, marine locator devices also include a temperature sensor arranged to measure a temperature proportional to the temperature of a body of water and/or a sea state sensor.

In some embodiments, marine locator devices also include an activation mechanism triggered by immersion in water and operable to activate the power supply and/or a manual activation mechanism operable to activate the power supply.

In some embodiments, marine locator devices also include a battery power supply that is switchable between the on and off states. The battery power supply can be switchable between the on and off states through manual operation, contact with water, or a control signal from a remote unit.

In some embodiments, the communication device broadcasts the information signal at fixed time intervals. In some cases, the information signal is encrypted.

In some embodiments, remote units also include a graphic user interface. Remote units can be operable to calculate the set and drift of marine locator devices and/or operable to calculate the course of intercept of the marine locator device.

Marine locator devices and systems as described herein can provide significant advantages including increased ease of manufacture and use and improved functionality. Marine locator device that do not use pyrotechnic signaling mechanisms can be less dangerous to manufacture, can have less stringent storage requirements, and can be less likely to pose personnel safety issues during and after use. For example, a marine locator device without pyrotechnic components that washes ashore after use does not contain a residue of compounds, such as red phosphorus, that might ignite as the device is being examined by a beach-goer. This also can lead to reduced certification requirements. For example, Hazards of Electromagnetic Radiation to Ordnance (HERO) or Weapon System Explosive Safety Review Board (WSESRB) certifications required before devices containing explosive/pyrotechnic material can be brought aboard US Navy ships can be avoided.

Global Positioning Systems and beacon lighting technologies can be combined to form a new marine location device. A Global Positioning System/Radio Beacon can provide pinpoint location of the marker while the infrared beacon feature more effectively enables a pilot's night time referencing with night vision goggles. Additional sensors can be included to provide information such as, for example, temperature and sea state, that can aid planning and prioritization of recovery efforts. Control of marine locator device components from a remote unit can provide increased operational security by minimizing emissions from the device to those necessary for recovery efforts and providing for a remote scuttling option. Control from a remote unit can also provide for increased operational effectiveness. For example, a marine locator device can be controlled to switch from visible light emission to infrared emission as a helicopter pilot using night vision goggles approaches.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
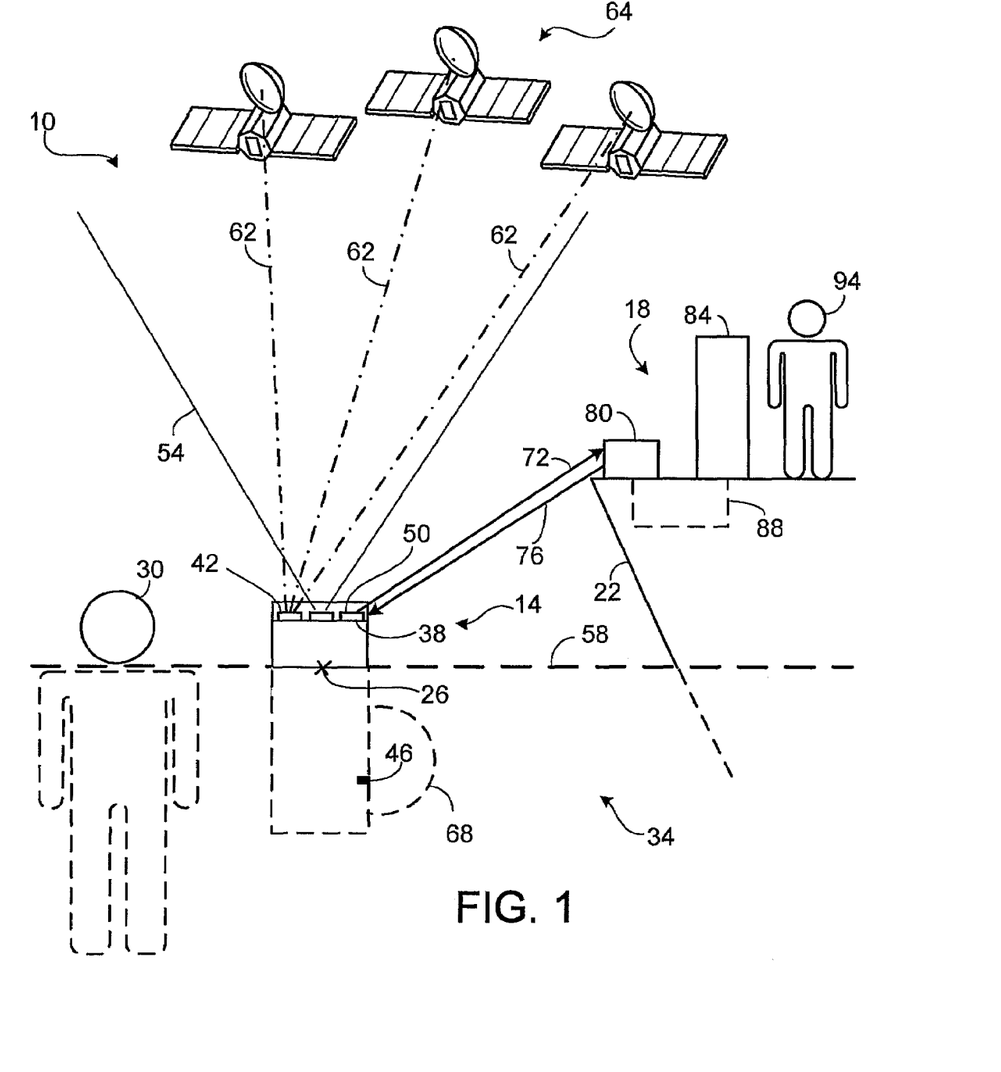
FIG. 1 is a schematic of a marine locator system.

Referring to FIG. 1, a locator system 10 includes a marine locator device 14 and a remote unit 18 on a control craft 22 (e.g., a ship, a boat, or a helicopter). Marine locator device 14 is deployed (e.g., thrown overboard, dropped from an aircraft) in the vicinity of an object or person 30 to be tracked in a body of water 34. For example, marine locator device 14 can be dropped from a search and rescue aircraft in the vicinity that a person is observed in the ocean. Although the location of person 30 can change in the time between an initial sighting and the arrival of a recovery craft due to the effects of wind, waves, and currents, the location of marine locator device 14 deployed in vicinity of person 30 will experience similar movements due to the effects of these same forces.

Marine locator device 14 includes a light section 38, a positioning system 42, a temperature sensor 46, and a transceiver 50. Positioning system 42 calculates the geographic position (e.g., latitude and longitude) of marine locator device 14 based on position signals 62 from satellites 64. Temperature sensor 46 measures the temperature of the water in which marine locator device 14 is deployed. Transceiver 50 broadcasts an information signal 72 including the geographic position of marine locator device 14 as well as output of temperature sensor 46. The water temperature as measured by temperature sensor 46 can be used to estimate survival time of a person in the water.

As a recovery craft approaches the approximate location of marine locator device 14, light section 38 emits a light signal 54 above a water surface 58 in response to a control signal 76 transmitted by remote unit 18 and received by transceiver 50. Light signal 54 aids in final localization of the marine locator device 14 and can be particularly useful under conditions (e.g., during combat operations) when ongoing electronic emissions may be undesirable. In some cases, control craft 22 acts as the recovery craft. In some cases, the recovery craft and control craft 22 are separate units.

Remote unit 18 includes a remote transceiver 80 and a user interface 84. Remote unit 18 is positioned aboard control craft 22. Remote transceiver 80 is in communication with user interface 84 through a communication channel 88. Remote transceiver 80 receives information signal 72 and transmits the information signal through communication channel 88 to user interface 84. In response to information signal 72, an operator 94 maneuvers control craft 22 in the direction of marine locator device 14. Through user interface 84, operator 94 generates control signal 76 to be broadcast from remote transceiver 80 to control the operation of marine locator device 14.

Figure 2A:
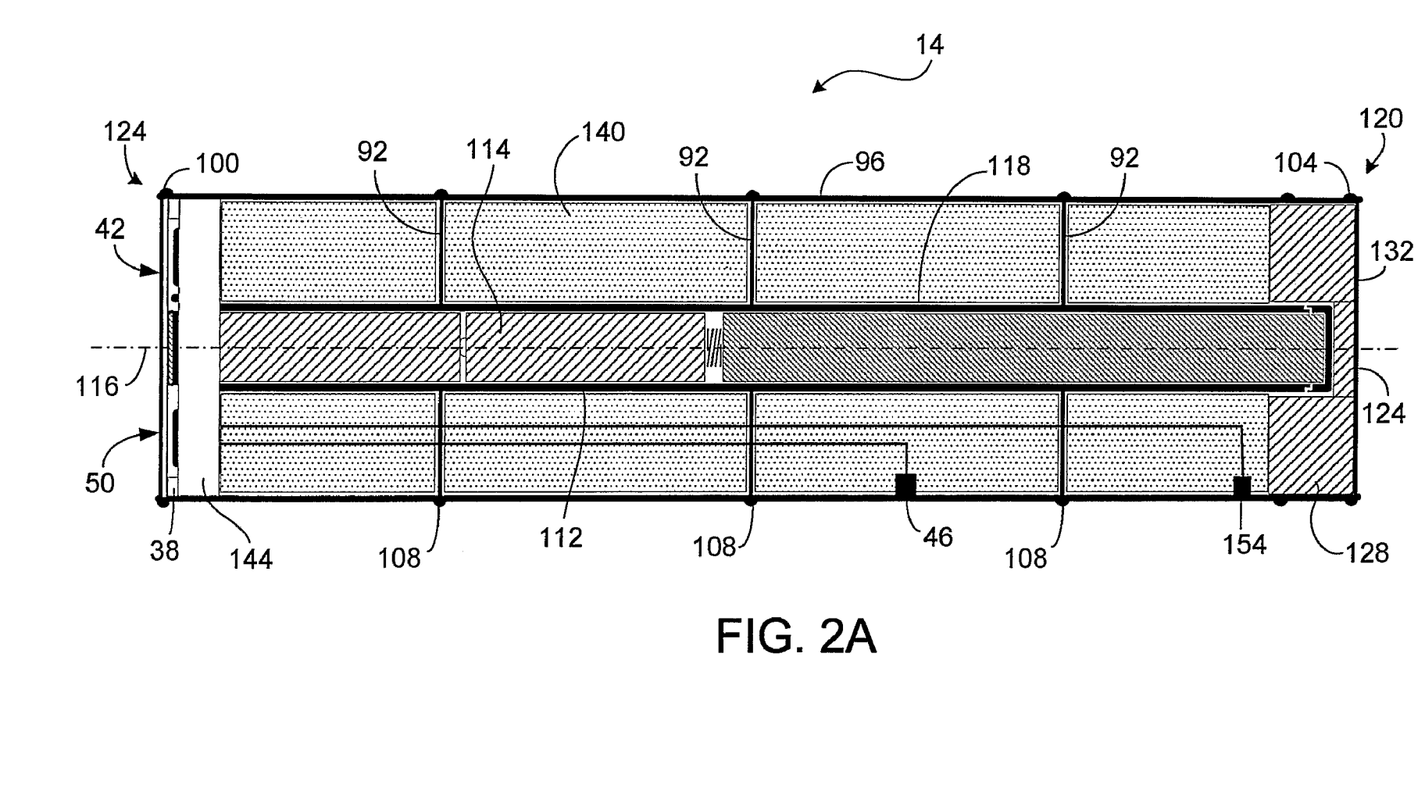
FIG. 2A is a side cross-section of a marine locator device.
Figure 2B:
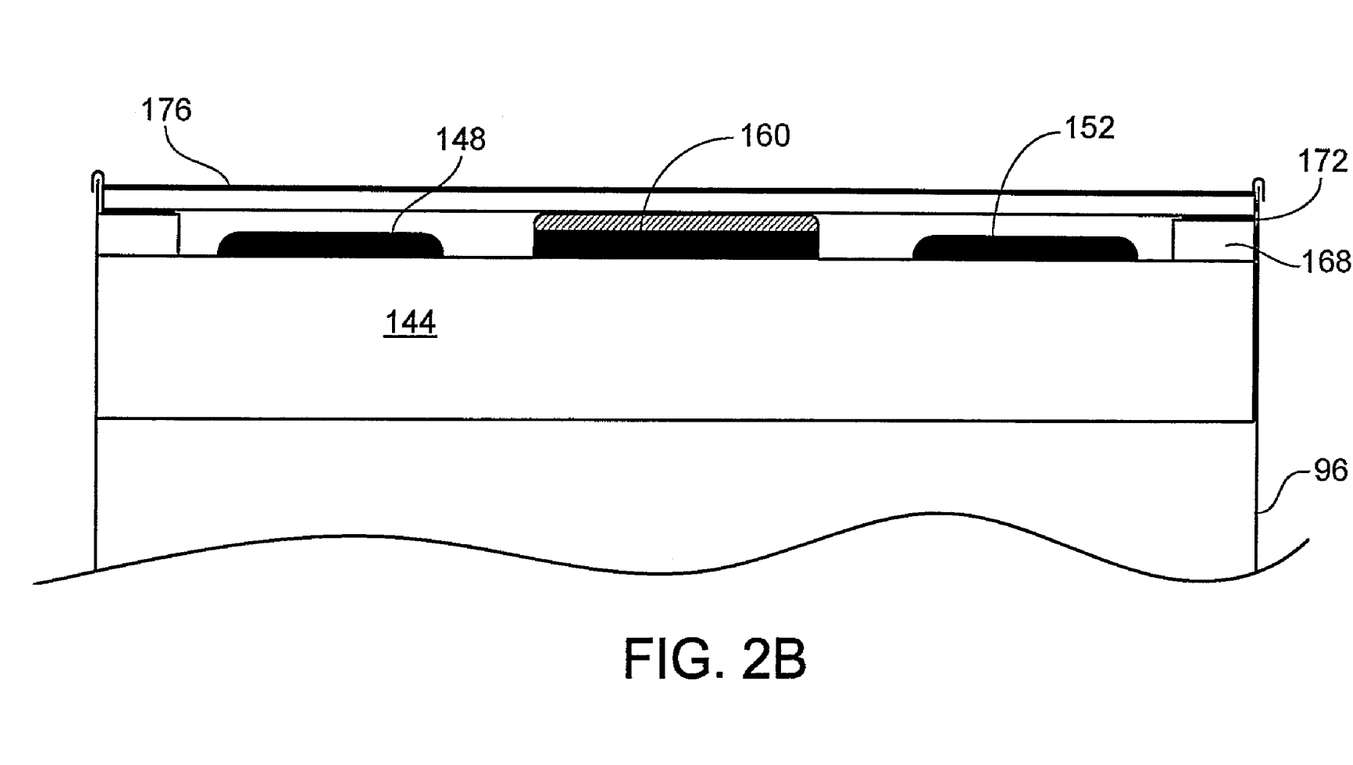
FIG. 2B is an enlarged cross-section of a portion of the marine locator device of FIG. 2A.

Referring to FIGS. 2A and 2B, marine locator device 14 includes a housing 96 to allow the marine locator device to withstand high-impact shocks or abrasion and cold or hot environmental conditions in storage or use without negatively impacting the performance of the device. Marine locator device 14 can be constructed to be of sufficient durability to withstand rough handling during storage and the impact forces during deployment and use. The durability will be accomplished by utilizing various material types and internal design features so that the marine locator device will operate as designed. In some embodiments, housing 96 is a cylindrical tube measuring approximately 21.7 inches (0.69 m) in length with an approximately 5-inch (12.7 cm) outer diameter to match the size envelope of an MK 58 MOD 1 Marine Location Marker (MK 58). This size combination allows marine locator device 14 to fit within current storage units used by the United States Navy, thereby facilitating the use of marine locator device 14 as a replacement for the MK 58.

Housing 96 is designed to allow the marine locator device 14 to withstand a launch from an aircraft (e.g., a fixed-wing aircraft flying at an altitude of 750 ft and a speed of 350 knots). Accordingly, housing 96 is a single piece with a top opening 100 and a bottom opening 104 made of a metal alloy, for example a corrosion resistant alloy such as aluminum, brass, plated steel, or stainless steel. For example, housing 96 may be formed using an extruded tube in a standard tube size (e.g., nominally 5.0 inches (12.7 cm) outer diameter with a wall thickness of between about approximately 0.0157 inch (0.4 millimeter) or 28-30 gauge standard steel) to minimize production costs and ensure production quality. Housing 96 can also be two or more pieces joined together to form a watertight seal. For example, pieces may be joined together using a weld, an adhesive, or an interference fit. Housing 96 can also be made of a high-impact plastic or other synthetic material such as nylon, polyvinyl chloride (PVC), or polycarbonates.

Crimps 108 are formed into housing 96. Crimps 108 increase the ability of housing 96 to withstand stresses without substantially deforming. For example, in the embodiment shown, crimps 108 allow housing 96 to better resist buckling stress that may result from launching marine locator device 14 from a moving aircraft or ship. In other embodiments, crimps 108 may be configured in other directions to resist additional stresses experienced by marine locator device 14 in use. In still other embodiments, crimps 108 may allow housing 96 to be gripped more securely by a person handling marine locator device 14.

The strength of housing 96 is reinforced by one or more support members 92 arranged along the inner surface of housing 96. For example, for embodiments including housing 96 as a cylindrical tube, support members may be rings with outer diameters approximately equal to the inner diameter of the housing. In these embodiments, the support members may be arranged along the inner surface of the housing an interference fit.

Marine locator device 14 includes a power supply 112. In the embodiment shown, power supply 112 is multiple batteries 114 arranged in a column coaxially aligned with the centerline axis 116 of housing 96. Power supply 112 can be replaceable and/or can be rechargeable. For example, power supply 112 may be recharged with power supply 112 still contained within marine locator device 114. As another example, power supply 112 may be removed from marine locator device 114 and subsequently recharged.

In some embodiments, including the embodiment shown, power supply 112 includes batteries 114 of a standard size. Configuring power supply 112 to operate on batteries 114 of a standard size minimizes the cost of power supply 112 and facilitates the procurement of replacements for batteries 114. For example, batteries 114 are standard D-cell batteries. To facilitate the use of batteries 114 of a standard size, power supply 112 includes a battery tube plug 118. In this embodiment, battery tube plug 118 holds batteries 114 in a fixed position within marine locator device 14 by preventing batteries 114 from moving along centerline 116. To prevent short-circuiting of an electric circuit including power supply 112, battery tube plug 118 is made of a non-conductive material (e.g., rubber or a similar synthetic material).

It should be appreciated that the range and operating time of marine locator device 14 will be proportional to the size (e.g. volume and weight) of power supply 112. Thus, to maximize the range and operating time of marine locator device 14, the size of power supply 112 should also be maximized. However, the upper end of the permissible size of power supply 112 may be limited by the desired weight, dimensions, and weight distribution of marine locator device 14. In some embodiments, power supply 112 includes eight D-cell batteries arranged in a column. In some embodiments, power supply 112 occupies a volume of approximately 25.69 in$^3$ (421 cm$^3$) and weighs approximately 2.43 lb (1.1 kg). In some embodiments, the nominal voltage of power supply 112 is 6 volts direct current with a capacity of 18-20 Amp-hours. In some cases, batteries 114 are arranged electrically into two banks.

In many embodiments, power supply 112 is deactivated when marine locator device 14 is not in use. For example, power supply 112 may be in a deactivated state when marine locator device 14 is stored aboard a ship. This increases the probability that power supply 112 will be at or near its maximum state-of-charge when marine locator device 14 is deployed into the water.

In some embodiments, power supply 112 may be activated by a user through a manual operation—e.g., flipping a switch to complete an activation circuit. In other embodiments, power supply 112 may become activated when marine locator device 14 is immersed in water for more than a few seconds. For example, power supply 112 may become activated when a sufficient volume of water enters into a battery activation chamber to complete the power supply circuit.

A bottom end 120 of marine locator device 14 is opposite a top end 124 of the marine locator device. The weight of marine locator device 14 is distributed such that the center of gravity of the marine locator device is located on axis 116 of the marine locator device closer to bottom end 120 than to top end 124. Although the orientation of marine locator device 14 is subject to environmental effects, the shape and location of the center of gravity bias the marine locator device towards an orientation in which bottom end 120 is below water and top end 124 above water when the marine locator device has been deployed. In particular, a weight 128 is fixed proximate to bottom end 124. In some embodiments, the amount and position of weight 128 may be adjusted to allow the center of gravity of marine locator device 14 to match the center of gravity of the MK 58. It should be appreciated that if the physical dimensions and weight of the marine locator device 14 match those of the MK 58 then further matching the center of gravity of the MK 58 allows marine locator device 14 to exhibit the same aerodynamic characteristics as the MK 58. In some embodiments, components (e.g., power supply 112) are chosen and arranged to provide the desired weight and center of gravity without the use of weight 128.

A bottom cap 132 is attached to bottom opening 104 of housing 96 to form a watertight seal, preventing water from entering marine locator device 14. In some embodiments, a permanent weld produces a watertight seal between bottom cap 132 and bottom opening 104. In other embodiments, the watertight seal between bottom cap 132 and bottom opening 104 is achieved by threading bottom cap 132 into the inner surface of housing 96, thereby compressing an o-ring between the bottom cap and the housing to form a watertight seal. Other sealing mechanisms (e.g., gaskets) can also be used.

Removable plug 124 is removable to provide access to power supply 112. For example, a user may remove removable plug 124 to replace or recharge power supply 112. In one embodiment, removable plug 124 threads into bottom cap 132 to compress an o-ring between the removable plug and the bottom cap to form a watertight seal. In another embodiment, removable plug 124 may include a water soluble portion that dissolves after a period of exposure to water, allowing water to enter and sink marine location marker 14. Some embodiments of marine locator device 14 without a removable power supply do not include removable plug 124.

A portion of the volume of the marine locator device 14 includes filler material 140 such as a resilient, medium-density (~3.6 pounds per cubic foot (57.67 kg/m$^3$) foam. In many embodiments, filler material 140 fills empty cavities within the marine locator device 14. For example, in the embodiment shown, filler material 140 fills the annular cavity between power supply 112 and housing 96, preventing power supply 112 from moving in the radial direction. In some embodiments, filler material 140 is of sufficient resilience to absorb shock and vibrations experienced by marine locator device 14. In some embodiments, filler material 140 provides thermal insulation to allow the marine locator device 14 to operate in cold water.

In the embodiment shown, filler material 140 is biodegradable foam, for example a foam based on soy starch or corn starch (e.g., GreenCell®). In this embodiment, the biodegradable foam provides positive buoyancy to marine locator device 14 while the biodegradable foam is dry. However, the biodegradable foam begins to degrade and dissolve when it is exposed to water. Thus, when the watertight integrity of housing 96 is breached, the annular region once filled with filler material 140 becomes filled with water and the marine locator device 14 begins sinking. That is, in this embodiment, the marine locator device 14 can be scuttled by displacing filler material 140 with water such that the marine locator device becomes negatively buoyant.

Filler material 140 may be a combination of two or more types of foam. In some embodiments, a combination of foams with varying degrees of degradability in water are used for filler material 140. In these embodiments, adjusting the volumetric fraction of slower-degrading foam relative to faster-degrading foam (e.g., Eco-Foam) changes the sinking time for marine locator device 14. Thus, in these embodiments, the composition of filler material 140 may be adjusted to achieve a desired sinking time for marine locator device 14 (e.g., fifteen minutes after filler material 140 is first exposed to water).

Temperature sensor 46 of marine locator device 14 is a surface mounted thermistor or resistance temperature detector (RTD) probe permanently mounted to the inside skin of housing 96 in a location which is below the waterline of the marine locator device when deployed. Temperature sensor 46 thus measures the temperature on the inside of housing 96 as a proxy for the temperature of the water surrounding marine locator device 14. The thermistor can be of the Negative Temperature Coeffecient (NTC) or Positive Temperature Coeffecient (PTC) type. This arrangement of the temperature probe does not require any protrusions beyond the surface of housing 96, thus maintaining the surface characteristics desired for air launch. Some non-air launch embodiments include other temperature sensor configurations (e.g., temperature sensors with external probes to measure local water temperature directly or temperature sensors potted flush with the outer surface of marine locator device 14) and/or other temperature sensors (e.g., thermocouple).

Positioning system 42 and transceiver 50 of marine locator device 14 are incorporated with a microcontroller into an electronics package 144 mounted in housing 96. The electronics of marine locator device 14 are encased in a shock-proof material (e.g., a urethane based, electronics grade potting material) so that the device handling, deployment, and environments encountered will not adversely affect the performance of the electronics and lighting located in the device. The microcontroller incorporated into electronics package 144 can be implemented through a combination of hardware and/or software components, modules, and tools.

In the illustrated embodiment, positioning system 42 and transceiver 50 are separate units that communicate with and are controlled by the microcontroller. In some alternate embodiments, the functions of positioning system 42 and transceiver 50 are features of the microcontroller itself. Electronics package 144 also provides encryption/decryption, timing, and activation/deactivation modules. These modules also can be implemented through a combination of hardware and/or software and can be separate units that communicate with and are controlled by the microcontroller or can be features of the microcontroller itself.

The encryption/decryption modules provide for secure transmissions when marine location device is being used in potentially hostile environments. However, the encryption/decryption modules can be deactivated when it is desired that anyone with a remote unit 18 be able read information signal 72 (e.g., when a civilian search and rescue operation is being conducted). In such instances, information signal 72 will be unencrypted but command functions of the microcontroller will be limited to remote units 18 with authorized access (e.g., verified with a password or requiring a specific encrypted control signal 76). Timing and activation/deactivation modules can provide for power conservation and security by turning off system components that are not being used and/or limiting active transmissions from marine locator devices 14.

Positioning system 42 is a global positioning system (GPS) unit that includes a GPS antenna 148 mounted on electronics package 144. In this embodiment, GPS antenna 148 is an antenna with a flat profile (e.g., a patch antenna). Use of a flat profile antenna maintains the surface characteristics desired for air launch. Transceiver antenna 152 similarly mounted on electronics package 144 is also a flat profile antenna for the same reason. Some non-air launch embodiments include other antenna configurations.

As discussed above, positioning system 42 calculates the geographic position (e.g., latitude and longitude) of marine locator device 14 based on position signals 62 from satellites 64. The microcontroller receives position information from positioning system 42 and water temperature information from temperature sensor 46. The microcontroller then uses transceiver 50, under circumstances described in more detail below, to broadcast information signal 72 including the geographic position of marine locator device 14 and local water temperature. In some embodiments, other sensors (e.g., a sea state sensor) included in marine locator device 14 provide information to the microcontroller that can be included in information signal 72.

Marine locator device 14 optionally includes a scuttling device 154 operable to breach the watertight integrity of housing 96 to sink the marine locator device. This can be desirable, for example, as a means of preventing the recovery of marine locator device 14 by unfriendly forces. In this embodiment, scuttling device 154 is a solenoid actuated valve in communication with and controlled by the microcontroller. Thus, marine locator device 14 can be scuttled, for example, a set period of time after deployment, as the power supply reaches a preset minimum level, or in response to a command included in control signal 76. The use of a non-pyrotechnic scuttling device 154 reduces concerns associated with the storage and disposal of explosive material. In some embodiments designed for applications where on-command scuttling is not required, marine locator device 14 includes a water-soluble scuffling device which dissolves after immersion for a specific period of time.

Referring to FIGS. 2A, 2B, 3A, and 3B, light section 38 includes a white light emitter 156 and an infrared emitter 160. A protective cover 164 is mounted to adjacent to emitters 156, 160 against the inside surface of housing 96. Protective cover 164 is fabricated from a clear high-impact resistant material such as acrylic, Lexan®, or other durable synthetic material that has high light transmission properties and is scratch/scuff resistant. Spacers 168 and gaskets 172 are located along the inner surface of housing 96 between protective cover 164 and electronics package 144 to help maintain the separation between the protective cover and the electronics package. Gaskets 168 are configured to prevent moisture intrusion into the device even when subjected to pressures of several times the normal operating conditions encountered and can be manufactured from rubber or synthetic material. In this embodiment, light emitters 156, 160 include appropriate spectrum frequency diodes focused parallel to axis 116 and toward top end 124 of marine locator device 14. Relative to arrays of emitters, this configuration increases the likelihood that light will be visible to aerial searchers even in high sea states (e.g., the focused light is more likely to penetrate airborne water particles associated with large waves). However, omni-directional strobes may also be used in some configurations. In some embodiments, a single light emitter with switchable filters, in place of the multiple light emitters, is used to selectively emit visible or infrared light.

Figure 3A:
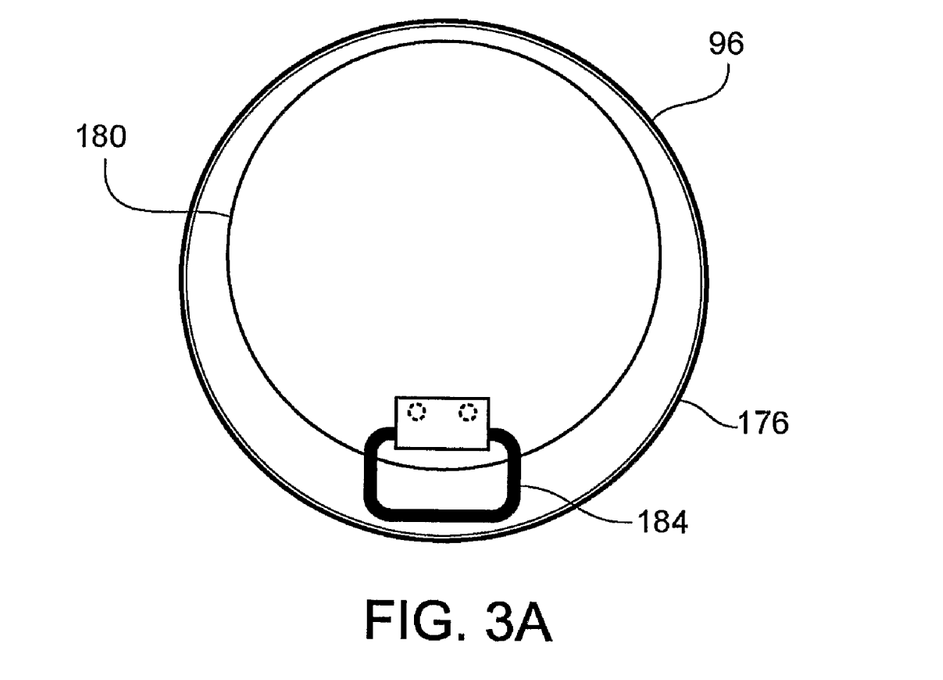
FIG. 3A is a top view of the marine locator device of FIG. 2 with a lid attached and covering a light section.

Referring to FIGS. 2B and 3A, marine locator device 14 includes a lid 176 mounted on housing 96 over protective cover 164 to prevent damage to the protective cover during handling and storage. Lid 176 includes a pull-away cover 180 with an attached D-ring 184 to facilitate removal of the pull-away cover. In this embodiment, lid 176 is manufactured of a corrosion resistant metal such as, for example, stainless or plated steel sheet or aluminum alloy. However, in some embodiments, other materials such as, for example, impact resistant plastics are used. Similarly, some embodiments use other configurations of lids 176 (e.g., lids screwed onto threads machined in the outer surface of housing 96) or omit lids altogether. Lids 176 are removed prior to deployment of marine locator devices 14 (e.g., by air crew members loading the devices aboard a search and rescue aircraft or by shipboard lookouts prior to throwing a marine locator over the side in the vicinity of a person who has fallen overboard). Lids 176 can also be configured for automatic removal by a launch system as part of device deployment.

Figure 3B:
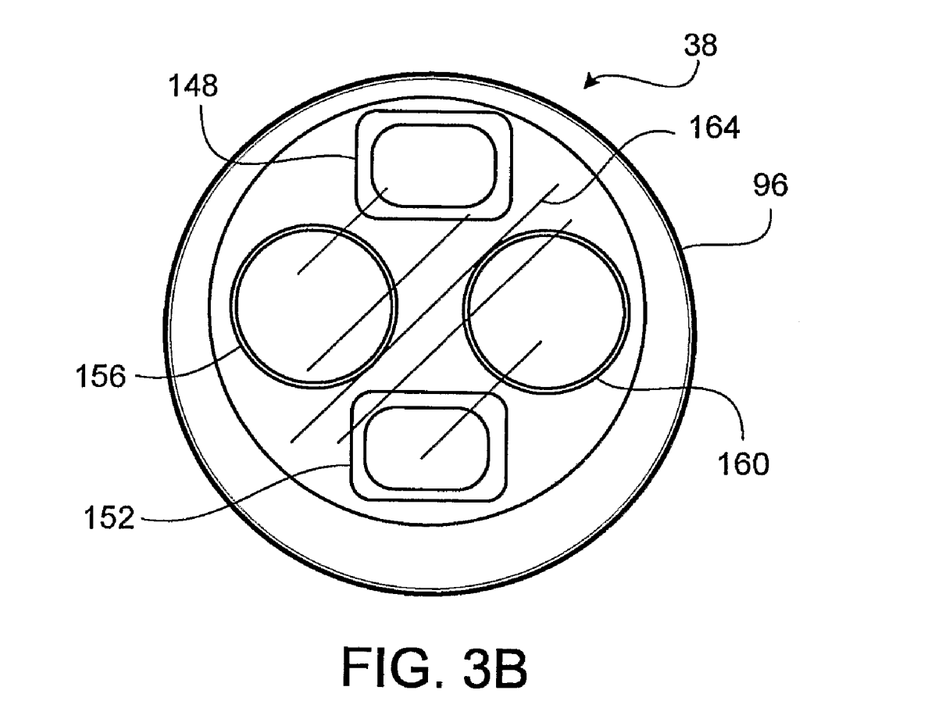
FIG. 3B is a top view of the marine locator device of FIG. 2 with the lid removed and exposing the light section.

Referring to FIG. 3B, white light emitter 156 and infrared emitter 160 are positioned on electronics package 144 in locations corresponding to the holes in existing MK-58 locator devices which are used for inflow of water and outflow of smoke and flames from these existing pyrotechnic-based locator devices. This positioning allows marine locator devices 14 to use housings produced for existing MK-58 locator devices.

Figure 4:
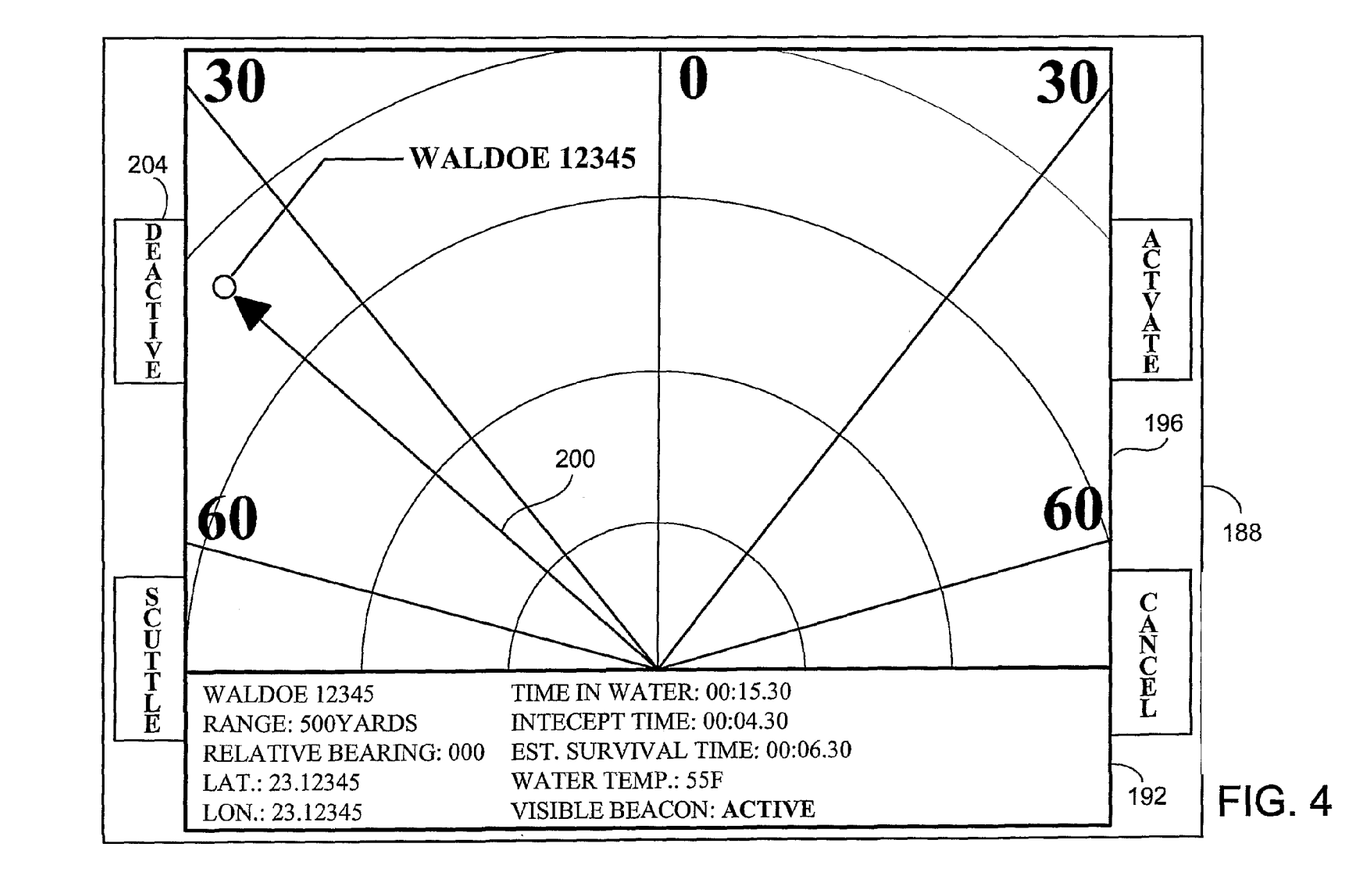
FIG. 4 is a front view of a graphic user interface on a remote device.

Referring to FIGS. 1 and 4, user interface 84 of remote unit 18 of marine locator system 10 is a graphical user interface 188 that can be used to control marine locator device 14. Remote unit 18 includes a processor that compares the geographic position of control craft 22 and/or the recovery craft (if a separate unit is being used to recover a person or object in the water) with the geographic location reported by marine locator device 14 through information signal 72. Remote unit 18 is set to display the information reported by a specific marine locator device 14 or a set of specific marine locator devices. Remote units 18 can calculate and display the set and drift (e.g., the rate and direction of movement) of marine location devices 14 based on changes in reported position of the marine locator devices.

Graphical user interface 188 displays the bearing and range from control craft 22 to a marine locator device 14 designated as WALDOE 12345 both in text box 192 and in plot 196. The bearing displayed can be relative bearing or true bearing. Graphical user interface 188 is configured to display the course and speed of control craft 22 as an arrow 200. If a separate unit is being used recover the person or object in water, remote unit 18 can display the range and bearing of marine locator device 14 from the recovery craft rather than control craft 22 assuming that the position of the recovery craft (absolute or relative to the control craft) is known. If marine locator system 10 is being used to recover a person in the water and the time of water entry is known and entered into remote unit 18, graphical user interface 188 displays time in the water as well as intercept time (e.g., the length of time it will take control craft 22 at present course and speed to reach marine locator device 14) and an estimated survival time based on the water temperature information transmitted by the marine locator device. Graphical user interface 188 also includes a touchscreen with buttons 204 to access menus controlling both remote unit 18 directly and marine locator device 14 via the selection of commands that will be included in control signal 76.

For purposes of illustration, the operation of marine locator system 10 is described as applied to the recovery of a person in the water in an area where hostile forces are present. As discussed above, marine locator device 14 has various other applications including for example, marking the location of a person in the water during civilian search and rescue operations and marking the location of floating contraband that has been spotted by military or law enforcement personnel. Different configurations and operational uses of marine locator device 14 are appropriate for different applications. Accordingly, the method of operation described below is illustrative in nature and will be modified to fit actual applications.

In operation, marine locator device 14 will be loaded aboard a fixed wing aircraft (e.g., an F/A-18) prior to its launch as part of a search for a pilot downed in waters near an enemy coastline. Aircrew members loading marine locator device 14 will remove pull away cover 180 to prepare the marine locator device for deployment. Encrypted information signal and command signal settings on marine locator device 14 will be selected and the unit specific identifier of the marine locator device would be loaded into remote unit 18 as part of the preparation process. Upon sighting the downed pilot, the fixed wing aircraft will launch marine locator device 14 to land in the water in the vicinity of the downed pilot.

At this time, remote unit 18 will establish communications with marine locator device 14 and perform a system check on the marine locator device while the fixed wing aircraft is still on station and able to deploy a second marine locator device if necessary. After the system check, remote unit 18 will send control signal 76 placing marine locator device 14 in a passive mode (e.g., not transmitting information signal 72 or emitting light signals) while a recovery unit such as, for example, a helicopter moves towards the reported position. Marine locator device 14 can be set to periodically broadcast position updates or can be set to remain in passive mode until activated by a new control signal 76. Both of these approaches reduce power usage of marine locator device 14 as well as limit emissions from the marine locator device that might attract the attention of hostile forces. Because both information signal 72 and control signal 76 are encrypted, the ability of hostile forces to access the position information contained in the information signal and/or to activate and control marine locator device 14 will be limited.

As the recovery unit approaches the general location of marine locator device 14, remote unit 18 will send control signal 76 telling the microcontroller of marine locator device 14 to begin more frequent (e.g., continuous) transmission of information signal 72. As the recovery unit approaches the specific location of marine locator device 14, remote unit 18 can send control signal 76 commanding the microcontroller to stop transmitting information signal 72 and to activate light section 38 to provide of light signal 54 to guide the final approach of the recovery helicopter. If the pilot of the recovery helicopter is using nightvision goggles for night recovery, infrared emitter 160 will be activated. Alternatively, when nightvision goggles are not being used, white light will be used and emitter 156 will be activated. After arrival at the location of marine locator device 14, the recovery craft will commence local search to find and recover the downed pilot. After recovery of the downed pilot, remote unit 18 will send control signal 76 commanding the microcontroller to activate scuttling device 154 thus allowing marine locator device 14 to fill with water and sink.

For some applications (e.g., small arm weapon targets and ship handling maneuvers), it is desirable for a marine location device to emit a steady display of smoke although a flame is not required. Smoke-generating marine location devices include environmentally friendly smoke-generating material (e.g., a mixture of chemicals such as potassium chlorate or potassium nitrate, sulfur, and sodium bicarbonate). The smoke-generating material can optionally include a coloring agent (e.g., dyes used for common firework art). The smoke-generating material is packed into device container with or in place of inert filler material with the duration of smoke controlled by the volume and weight of smoke-generating materials used. The ignition can be DC induced ignition (e.g., a electric match) from either a water activated battery or ignition button prior to manual launch. Smoke-generating marine location devices can include some or all of the features of the non-pyrotechnic embodiments described above. However, weight and volume requirements for smoke-generating material to generate smoke for a given duration can reduce the capacity of marine location devices to include all of the components of the non-pyrotechnic embodiments. Although containing pyrotechnic material, replacement of red phosphorus with environmentally friendly smoke-generating material can provide improvements in ease of manufacture, storage, and use.

A number of embodiments of the invention have been described. Nevertheless, it will be understood that various modifications may be made without departing from the spirit and scope of the invention.

For example, some marine locator device embodiments incorporate a sea-state sensor. Such a sea-state sensor can be of a mechanical or electronic nature with construction design features that shall detect and transfer motion information/data to the microcontroller. In some cases, a mechanical device includes a hollow tube or cylinder that will detect movement of a ball or roller inside the tube and estimate sea state based on the detected movements (e.g., inertia of the marine locator device causes a reaction to wave motion with the ball or roller making contact with each end of the tube in response to the wave-induced motion). Similarly, an electronic motion sensor located within the device could also be incorporated to provide the same sea-state data.

Accordingly, other embodiments are within the scope of the following claims.

What is claimed is:

1. A marine locator device comprising:
   a light section including a visible light emitter and an infrared light emitter;
   a communication device operable to broadcast an information signal and to receive a control signal from a remote unit;
   a controller operable to communicate with and control the light section and the communication device; and
   a power supply electrically connected with the light section, the communication device, a positioning system, and the controller;
   wherein a positioning system is configured to determine geographic coordinates of the device and the controller is operable to communicate with and control the positioning system and to incorporate the geographic coordinates into the information signal;
   wherein the controller is operable to switch between the visible light emitter and the infrared light emitter in response to the control signal from the remote unit; and
   wherein the controller is operable to stop the broadcast of the information signal in response to the control signal from the remote unit.

2. The device of claim 1 wherein the controller includes a decryption module operable to decrypt the control signal.

3. The device of claim 1 further comprising a substantially cylindrical container.

4. The device of claim 3 wherein the container comprises a transparent portion through which light from the light section is emitted, the transparent portion located at a first end of the container.

5. The device of claim 3 wherein the container includes an interior cavity, the interior cavity extending axially within the container from a second end of the container that is opposite a first end of the container.

6. The device of claim 5 wherein the power supply weighs at least 2 pounds and is positioned in the interior cavity such that a center of gravity of the device is closer to the second end of the container than to the first end of the container.

7. The device of claim 1 further comprising a scuttling device operable to allow water into the container.

8. The device of claim 7 further comprising a timing mechanism operable to activate the scuttling device.

9. The device of claim 7 wherein the scuttling device comprises a solenoid.

10. The device of claim 1 further comprising a scuttling device operable to allow water into the container and wherein the controller is operable to activate the scuttling device in response to a scuttling signal received through the communication device.

11. The device of claim 1 wherein the power supply has a nominal voltage of 6 volts direct current and a capacity of at least 15 ampere-hours.

12. The device of claim 1 further including a temperature sensor arranged to measure a temperature proportional to the temperature of a body of water.

13. The device of claim 1 wherein the communication device broadcasts the information signal at fixed time intervals.

14. The device of claim 1 wherein the information signal is encrypted.

15. The device of claim 1 further comprising a sea state sensor.

16. The device of claim 1 further comprising an activation mechanism triggered by immersion in water and operable to activate the power supply.

17. The device of claim 1 further comprising a manual activation mechanism operable to activate the power supply.

18. A marine locator system comprising:
a remote unit comprising a control signal generator and a transmitter; and
a marine locator device comprising:
 a light section including a light emitter and an infrared light emitter,
 a communication device operable to broadcast an information signal and to receive a control signal from the remote unit,
 a controller operable to communicate with and control the light section and the communication device, and
 a positioning system configured to determine geographic coordinates of the device,
wherein the controller is operable to communicate with and control the positioning system and to incorporate the geographic coordinates into the information signal;
wherein the controller is operable to switch between the visible light emitter and the infrared light emitter in response to the control signal from the remote unit; and
wherein the controller is operable to stop broadcast of the information signal in response to the control signal from the remote unit.

19. The system of claim 18 wherein the remote unit further comprises a graphic user interface.

20. The system of claim 18 wherein the remote unit is operable to calculate the set and drift of the marine locator device.

21. The system of claim 18 wherein the remote unit is operable to calculate the course of intercept of the marine locator device.

22. A marine locator device comprising:
a substantially cylindrical watertight container approximately 21.7 inches long with an outer diameter of approximately 5 inches with a first end and a second end opposite the first end, the container including transparent portion on the first end, wherein a center of gravity of the device is closer to the second end of the container than to the first end of the container;
a light section including a visible light emitter and an infrared light emitter;
a two-way radio transceiver connected to the power supply and microcontroller and operable to broadcast an encrypted information signal beyond the watertight cylindrical container and further operable to receive an encrypted control signal generated by a remote unit;
a microcontroller operable to communicate with and to control the operating states of the first light beacon, the second light beacon, and the two-way radio transceiver;
a Global Positioning System receiver wherein the microcontroller is operable to communicate with and control the Global Positioning System receiver and to incorporate the geographic coordinates into the encrypted information signal; and
a temperature sensor arranged to measure a temperature proportional to the temperature of water surrounding the watertight cylindrical container and to communicate the sensed temperature to the microcontroller; and
a non-pyrotechnic scuttling device comprising a solenoid.

23. The device of claim 22 further comprising a battery power supply.

24. The device of claim 23 wherein the battery power supply has a nominal voltage of 6 volts direct current with a capacity of 18-20 Amp-hours.

* * * * *

UNITED STATES PATENT AND TRADEMARK OFFICE
CERTIFICATE OF CORRECTION

PATENT NO. : 7,695,335 B2 Page 1 of 1
APPLICATION NO. : 11/916608
DATED : April 13, 2010
INVENTOR(S) : Paul J. Ricciuti et al.

It is certified that error appears in the above-identified patent and that said Letters Patent is hereby corrected as shown below:

TITLE PAGE, column 1, Assignee, delete "Logeon" and insert -- Logcon --.

In Claim 1, at column 12, line 36, delete "elcctrically" and insert -- electrically --.

In Claim 1, at column 12, line 37, delete "dcvice" and insert -- device --.

In Claim 11, at column 13, line 10, delete "whcrein" and insert -- wherein --.

In Claim 22, column 14, line 15, delete "diamcter" and insert -- diameter --.

In Claim 22, column 14, line 34, delete "encryptcd" and insert -- encrypted --.

Signed and Sealed this

Third Day of August, 2010

David J. Kappos
*Director of the United States Patent and Trademark Office*